United States Patent
Ibrahim et al.

(10) Patent No.: US 8,849,508 B2
(45) Date of Patent: Sep. 30, 2014

(54) DRIVER ASSISTANCE SYSTEM AND METHOD

(75) Inventors: Faroog Ibrahim, Dearborn Heights, MI (US); Michael J. Higgins-Luthman, Livonia, MI (US)

(73) Assignee: TK Holdings Inc., Auburn Hills, MI (US)

( * ) Notice: Subject to any disclaimer, the term of this patent is extended or adjusted under 35 U.S.C. 154(b) by 85 days.

(21) Appl. No.: 13/427,712

(22) Filed: Mar. 22, 2012

(65) Prior Publication Data

US 2012/0253596 A1 Oct. 4, 2012

Related U.S. Application Data

(60) Provisional application No. 61/468,527, filed on Mar. 28, 2011.

(51) Int. Cl.
*G06G 7/76* (2006.01)
*G06G 7/78* (2006.01)
*G08G 1/16* (2006.01)
*G06K 9/00* (2006.01)

(52) U.S. Cl.
CPC ............ *G08G 1/167* (2013.01); *G06K 9/00798* (2013.01)
USPC ............................................ 701/36; 701/301

(58) Field of Classification Search
CPC ... B60W 40/00; B60W 40/04; B60W 40/072; B60W 40/10; B60W 2550/402; B60W 2030/006; B60W 50/10; B60W 50/14; G08G 1/16; G08G 1/167; G06K 9/00798; G06K 9/00825; G01C 21/00
USPC .......... 701/36, 301; 348/148–149; 340/425.5, 340/436

See application file for complete search history.

(56) References Cited

U.S. PATENT DOCUMENTS

| | | | |
|---|---|---|---|
| 5,034,679 A | 7/1991 | Henderson et al. | |
| 6,819,779 B1* | 11/2004 | Nichani | ........................ 382/104 |
| 7,639,148 B2 | 12/2009 | Victor | |
| 7,647,180 B2 | 1/2010 | Breed | |
| 7,755,682 B2 | 7/2010 | Lin | |
| 7,788,008 B2 | 8/2010 | Breed | |
| 7,835,834 B2 | 11/2010 | Smith et al. | |
| 7,840,355 B2 | 11/2010 | Breed et al. | |
| 7,876,957 B2 | 1/2011 | Ovsiannikov et al. | |
| 7,899,616 B2 | 3/2011 | Breed | |
| 7,970,172 B1 | 6/2011 | Hendrickson | |
| 8,000,897 B2 | 8/2011 | Breed et al. | |
| 8,004,588 B2 | 8/2011 | Lukac | |
| 8,005,297 B2 | 8/2011 | Hung et al. | |
| 8,035,704 B2 | 10/2011 | Hu et al. | |
| 8,036,788 B2 | 10/2011 | Breed | |
| 2005/0200467 A1* | 9/2005 | Au et al. | ........................ 340/465 |
| 2006/0215076 A1 | 9/2006 | Karim | |
| 2009/0109648 A1 | 4/2009 | Hay | |
| 2011/0046843 A1 | 2/2011 | Caveney | |
| 2011/0054716 A1 | 3/2011 | Stahlin et al. | |
| 2011/0098922 A1 | 4/2011 | Ibrahim | |

* cited by examiner

*Primary Examiner* — Yonel Beaulieu
(74) *Attorney, Agent, or Firm* — Foley & Lardner LLP

(57) ABSTRACT

A driver assistance system includes a stereo vision system that includes at least one camera and at least one sensor disposed on or in a vehicle; a roadside marker detection unit configured to receive stereo image data from the stereo vision system, and to detect roadside markers from the stereo image data; and a road path estimation unit configured to estimate a road path in a direction of travel of the vehicle, based on the roadside markers detected by the roadside marker detection unit.

23 Claims, 2 Drawing Sheets

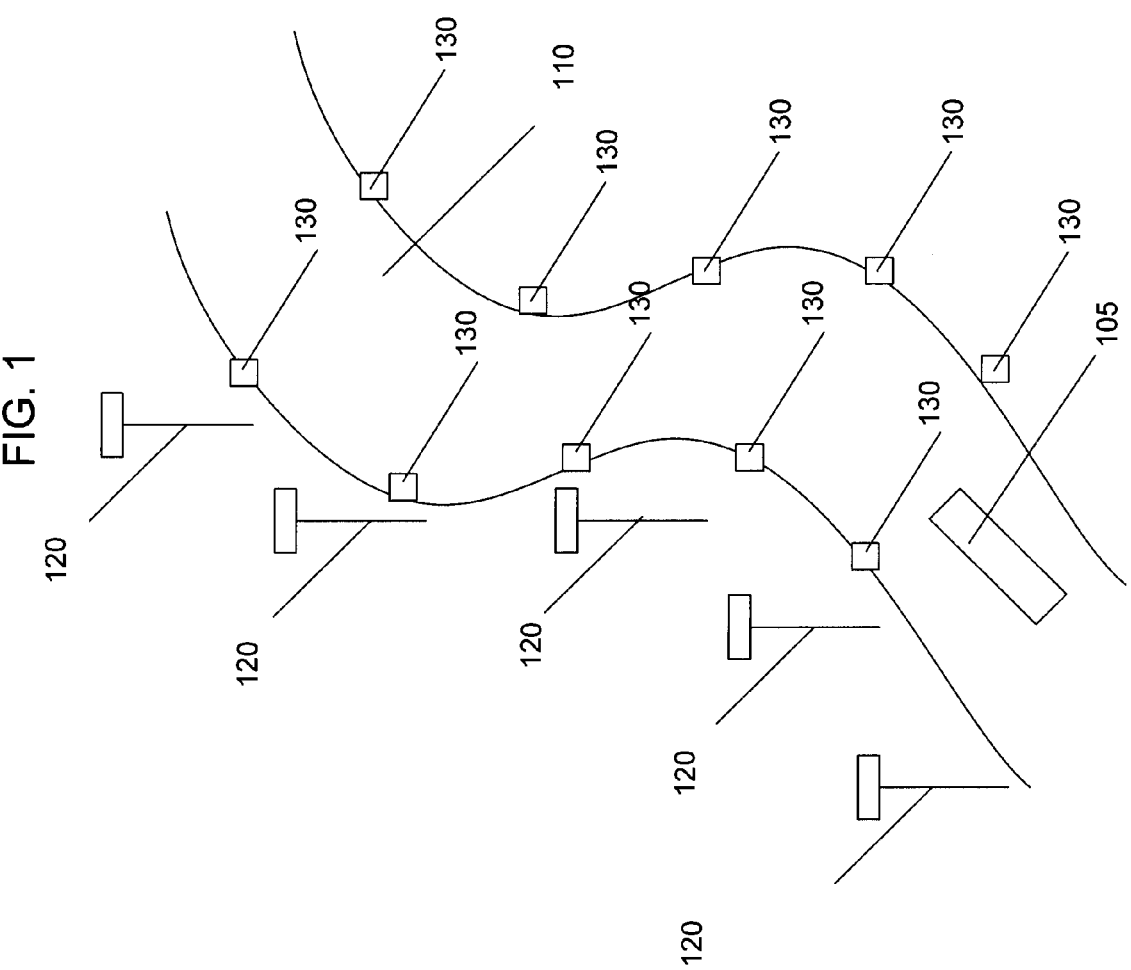

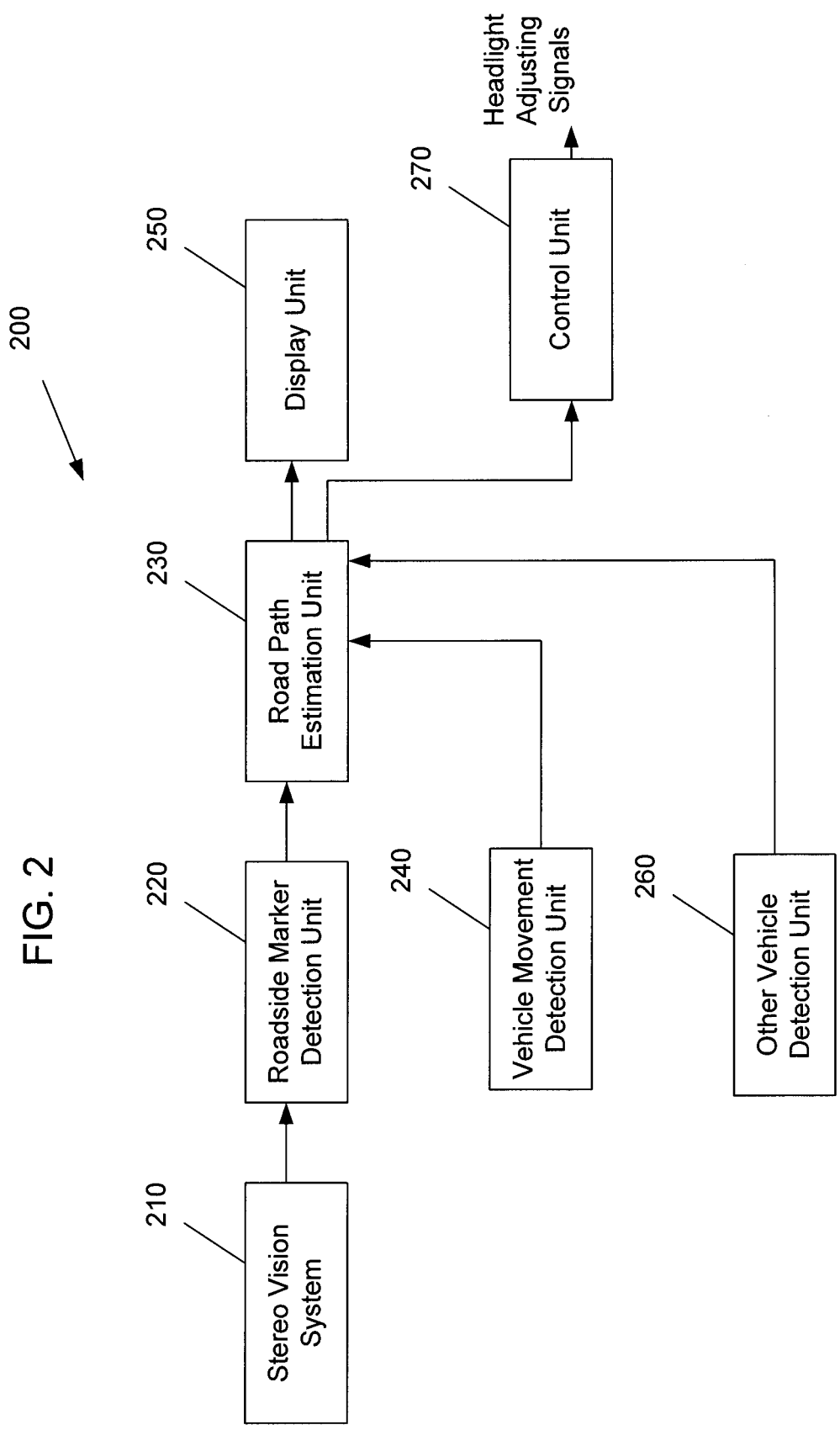

DRIVER ASSISTANCE SYSTEM AND METHOD

CROSS-REFERENCE TO RELATED PATENT APPLICATION

This application claims priority from U.S. Provisional Application No. 61/468,527, filed Mar. 28, 2011, incorporated herein by reference in its entirety.

FIELD OF THE INVENTION

The present disclosure relates generally to the field of driver assistance systems. More particularly, the disclosure relates to a driver assistance system and method incorporating a stereo vision system.

FIELD OF THE INVENTION

Driver assistance systems are becoming prevalent in vehicles. One driver assistance system provides for estimating a current road path using different algorithms based on whether it is daytime or nighttime.

SUMMARY OF THE INVENTION

According to one exemplary embodiment, a driver assistance system includes a stereo vision system that includes at least one camera and at least one sensor disposed on or in a vehicle. The driver assistance system also includes a roadside marker detection unit configured to receive stereo image data from the stereo vision system, and to detect roadside markers from the stereo image data. The driver assistance system further includes a road path estimation unit configured to estimate a road path in a direction of travel of the vehicle, based on the roadside markers detected by the roadside marker detection unit.

According to another exemplary embodiment, a non-transitory computer readable medium storing computer program code that, when executed by a computer, causes the computer to perform the functions of: code that receives stereo image data from the stereo vision system, and that detects roadside markers from the stereo image data; and code that estimates a road path in a direction of travel of the vehicle, based on the roadside markers detected from the stereo image data.

According to yet another exemplary embodiment, a method of providing driver assistance when driving a vehicle includes: receiving stereo image data from the stereo vision system; detecting roadside markers from the stereo image data; and estimating a road path in a direction of travel of the vehicle, based on the roadside markers detected from the stereo image data.

BRIEF DESCRIPTION OF THE DRAWINGS

FIG. 1 shows a road path on which a vehicle is traveling, for which a driver assistance system according to an exemplary embodiment can provide upcoming road the information to assist the vehicle operator to drive along the upcoming road path.

FIG. 2 shows a driver assistance system according to an exemplary embodiment.

DETAILED DESCRIPTION

Driver assistance system use roadway-related vision applications during the day and at night and are generally split into short range and longer range vision systems. For distances shorter than about 200 m, the vision system algorithms are also divided into two groups. One group is for obstacle detection where the roadway surface is treated as background or clutter and is filtered out. A second group is for lane detection and tracking where the roadway surface is generally assumed to be flat. Some stereo vision-based 3D lane detection systems estimate pitch, roll, and vertical curvature of the road lane using reconstructed 3D points inside a predicted search region.

However, these systems and methods focus on lane detection and therefore result in a number of restrictions: 1) only the part of the roadway that is inside the predicted lanes is used for vertical profile estimation; 2) the vertical profile estimation depends on the existence and detectability of painted lane markers; 3) lane detection is a separate procedure from obstacle detection, thus occlusion of roadway by any objects will degrade or disable road lane vertical profile estimation; 4) lane markers are less and less visible at distances beyond 50 m; and 5) other methods are limited to around 200 m and have nighttime limitations.

Nighttime applications may benefit from longer range to predict the roadway path because the structure of the road ahead is less visible than in the daytime to the driver. This prediction may assist in headlight beam steering and in the prevention of shining headlights at other drivers while lighting up the potentially non-straight and non-flat road ahead of the host vehicle.

According to various exemplary embodiments, a driver assistance system may include a stereo vision system. The driver assistance system may use the stereo vision system to predict three-dimensional properties of a roadway geometry. The stereo vision system may be used to predict the three-dimensional properties during the day or at night. The predicted 3D properties may then be provided on a display for driver viewing or may automatically be used to steer vehicle headlights or control other vehicle functions.

The driver assistance system may use the ranging and 3D capabilities of the stereo vision system to map, analyze and report the road pathway and nearby area to generate a predictive road geometry at night. The driver assistance system may use detected streetlights, regular pattern roadside markers, and vehicle movement to assist in generation of the predictive geometry. Streetlights are generally oriented in line patterns that follow the road path for many high traffic roads. If the road is curved, generally, so is the streetlight pattern. The driver assistance system may generate a curve fit of the streetlights that shows the pattern of the road in 3D space.

In Europe (mainly in Germany and Sweden), a pattern of roadside colored reflectors are on posts at both sides of some rural roads. About every 50 meters there are white (or colored) reflectors on the side of the road. At intersections there are different colored reflectors. The reflector markers provide distance information and information about the road edge until they are too dim to be seen. Different countries in Europe have different patterns of reflectors that also provide this information. The driver assistance system may detect the reflectors using the stereo vision system and generate a curve fit of the reflectors that shows the pattern of the road in 3D space.

Adaptive cruise control systems, forward collision warning systems and other vehicle systems use a vision system to detect vehicle movement at distances shorter than a predetermined distance, such as a distance of about 200 m. An automatic high beam system having stereo input from a stereo vision system can detect vehicle range for distances near 500 m with some noise that may prevent accurate velocity estimation. However, most vehicles having an automatic high beam system also include paired headlights and taillights that allow cross-checking of stereo distance estimations. At night, the driver assistance system may use other detected vehicles on the roadway to assist in determining the shape of the roadway up to 500 m and beyond. This is significantly more distance than existing systems may provide.

Therefore, at night the driver assistance system may use methods for seeing road boundaries at closer distances and vehicles on the road at longer distances out to about 500 m. Use of independent sources for predicting the road geometry ahead of the host vehicle may also provide benefits to the auto high beam application. The driver assistance system has knowledge of the road and which light sources are vehicles, reflectors, and streetlights. The driver assistance system may use this information to assist with automatic high beam, adaptive cruise control, forward collision warning and road path estimation systems.

The roadway is a dynamic surface that changes in all three dimensions and in time. The driver assistance system and stereo vision system may detect and measure the changes in these dimensions in real-time to optimize the response for lighting control, steering control, braking control and acceleration control, thereby enhancing safety and fuel efficiency and enabling autonomous vehicle control.

The specific measurements that the are taken by the driver assistance system using the stereo vision system include roadway vertical curvature, roadway radius of curvature and roadway obstacles that define the physical boundaries of the road edge. The driver assistance system may represent the roadway vertical curvature measurement as a polynomial. The host vehicle does not have to be on a hill or valley to take this measurement. The driver assistance system may represent the roadway radius of curvature measurement as a polynomial. The host vehicle does not have to be on a curve to take this measurement. The driver assistance system may represent the roadway obstacles that define the physical boundaries of the road edge as a size versus lateral and longitudinal downrange distance. Usage of these measurements allows the driver assistance system to make roadway predictions at significantly farther distances than before.

A driver assistance system having a stereo vision system for predicting three-dimensional properties of a road way geometry has several advantages related to real-time detection and measurement. Such advantages include overcoming the deficiencies of map database information that may be out-dated, overcoming the deficiencies of GPS in combination with map database information that does not have the accuracy required to perform the described measurements with the accuracy required for active safety and autonomous driving features, overcoming the deficiencies and measurement errors in monocular image processing for detection of radius of road curvature, more accurate prediction and control of headlights, acceleration, deceleration, speed and path for a vehicle, detection of road shape ahead by using road boundary markers and near and distant vehicles on the road at night, detection of road shape at night for longer distances than possible in daytime, better energy management prediction and control for a vehicle.

Although the driver assistance system is described as including multiple features utilized in conjunction with one another, the system may alternatively utilize more or less than all of the noted mechanisms or features. For example, in other exemplary embodiments, there may be more or fewer systems using the vision system, various systems may be combined, etc. Further, the driver assistance system may be used in an environment other than a vehicle.

FIG. 1 shows a road 110 on which a vehicle 105 is traveling, for which a driver assistance system according to an exemplary embodiment of the invention can be used to estimate the road path. Street lights 120 are disposed along a path of the road 110, whereby light emanating from the street lights 120 can be detected and used to estimate an upcoming path of the road 110. Road reflectors 130 are also disposed on sides of the travel lane of the road 110, and also their light can be detected and used to estimate an upcoming path of the road 110.

FIG. 2 shows a driver assistance system 200 according to an exemplary embodiment. A stereo vision system 210 includes one or more sensors and cameras disposed on the vehicle, and outputs stereo image data corresponding to a surrounding region of the vehicle. A roadside marker detection unit 220 receives the stereo image data, and detects roadside markers within the stereo image data (and thus, the angle of incidence of received light and the intensity of the received light can indicate whether the received light is from a street light or is from a roadside marker or is not from either of those). This can be done, for example, based on historical data of standard heights and light intensities of street lights in a country or locality where the vehicle is currently traveling, whereby the pixel data corresponding to the stereo image data can be analyzed to determine if any portions of the stereo image data may correspond to a street light. Also, light reflectors may be provided on the sides of a lane of the road on which the vehicle is traveling, and the roadside marker detection unit 220 can also detect the presence of the light reflectors. The detection of light reflectors can be performed, for example, based on historical data of standard light reflectors and light intensities of light reflectors in a country or locality where the vehicle is currently traveling, whereby the pixel data corresponding to the stereo image data can be analyzed to determine if any portions of the stereo image data may correspond to a road reflector.

A road path estimation unit 230 estimates an upcoming road path in a direction the vehicle is traveling, based on the detected road markers provided by the roadside marker detection unit 220. A road path estimation unit 230 estimates an upcoming road path of the vehicle in a direction in which the vehicle is traveling, based on the assumption that the positions of the roadside markers forms a locus of points that is substantially the same as the locus of points that form the path of the road on which the vehicle is traveling.

In some embodiments, the output of the roadside marker detection unit 220 is used to detect an upcoming portion of the road path closest to the vehicle, such as the next 500 meters in front of the vehicle, and whereby an other vehicle detection unit 260 is provided to detect other vehicles in the vicinity of the vehicle, and whereby information as to the location of those other detected vehicles output by the other vehicle detection unit 260 is used to detect an upcoming portion of the road path further from the vehicle, such as a portion of the road path more than 500 meters in front of the vehicle. As such, FIG. 2 shows outputs of both the roadside marker detection unit 220 and the vehicle movement detection unit 240 being provided to the road path estimation unit 230.

A display unit 250 displays the estimated road path for easy viewing by the vehicle operator, such as on the vehicle dashboard, so that the vehicle operator can be made aware of any upcoming curves in the road and/or changes in elevation (e.g., road is going up a hill or down a hill in the next 200 meters) on which the road path leads. The display unit 250 displays the road path as a three-dimensional view in some embodiments.

Based on the estimated road path as provided by the road path estimation unit 230, a control unit 270 automatically adjusts the headlights of the vehicle accordingly, so that if the vehicle will be traveling up a steep incline, the headlights of the vehicle are adjusted to point slightly downward from their current position, and if the vehicle will be traveling up a steep decline, the headlights of the vehicle are adjusted to point slightly upward from their current position, so as to thereby be optimally positioned for the vehicle operator to see the road in front of him/her.

In some embodiments, the vehicle operator can input a setting (via a button on the dashboard, for example) that either turns off or turns on the automatic headlight control performed by the control unit 270.

The present disclosure has been described with reference to example embodiments, however persons skilled in the art will recognize that changes may be made in form and detail without departing from the spirit and scope of the disclosed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the exemplary embodiments is manifestly intended to be as broad as possible. For example, unless specifically otherwise noted, the exemplary embodiments reciting a single particular element also encompass a plurality of such particular elements.

Exemplary embodiments may include program products comprising computer or machine-readable media for carrying or having machine-executable instructions or data structures stored thereon. For example, the driver monitoring system may be computer driven. Exemplary embodiments illustrated in the methods of the figures may be controlled by program products comprising computer or machine-readable media for carrying or having machine-executable instructions or data structures stored thereon. Such computer or machine-readable media can be any available media which can be accessed by a general purpose or special purpose computer or other machine with a processor. By way of example, such computer or machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of computer or machine-readable media. Computer or machine-executable instructions comprise, for example, instructions and data which cause a general purpose computer, special purpose computer, or special purpose processing machines to perform a certain function or group of functions. Software implementations of the present invention could be accomplished with standard programming techniques with rule based logic and other logic to accomplish the various connection steps, processing steps, comparison steps and decision steps.

The invention claimed is:

1. A driver assistance system, comprising:
  a stereo vision system that includes at least one camera and at least one sensor disposed on or in a vehicle;
  a roadside marker detection unit configured to receive stereo image data from the stereo vision system, and to detect roadside markers from the stereo image data;
  a road path estimation unit configured to estimate a road path in a direction of travel of the vehicle, based on the roadside markers detected by the roadside marker detection unit; and
  a vehicle detection unit configured to detect presence of other vehicles,
  wherein the road path estimation unit estimates a first portion of the road path based on the roadside markers and estimates a second portion of the road path based on the detected other vehicles, and
  wherein the first portion of the road path is closer to the vehicle than the second portion of the road path.

2. The driver assistance system according to claim 1, wherein the roadside marker detection unit detects light emanating from street lights, and
  wherein the road path estimation unit estimates a location of each detected street light detected and estimates the road path as substantially corresponding to a curve formed by a locus of points corresponding to locations of each detected street light.

3. The driver assistance system according to claim 1, wherein the roadside marker detection unit detects reflectors provided on sides of a road on which the vehicle is traveling, and
  wherein the road path estimation unit estimates a location of each detected reflector detected and estimates the road path as substantially corresponding to a curve formed by a locus of points corresponding to locations of each detected reflector.

4. The driver assistance system according to claim 1, further comprising:
  a vehicle movement detection unit configured to detect a linear movement of the vehicle,
  wherein the road path estimation unit is configured to estimate the road path based in part on the linear movement of the vehicle detected over a predetermined time period.

5. The driver assistance system according to claim 4, wherein the predetermined time period is a time period from a current time to X seconds in the past, X being a real number.

6. The driver assistance system according to claim 1, wherein the roadside marker detection unit is configured to detect relative three dimensional disposition of the roadside markers from the stereo image data with respect to each other.

7. The driver assistance system according to claim 1, wherein the road path estimation unit is configured to estimate an upwards and downwards disposition of the road path in the direction of travel of the vehicle.

8. The driver assistance system according to claim 1, further comprising:
  a display unit configured to provide a display of the estimated road path in the direction of travel of the vehicle.

9. The driver assistance system according to claim 8, wherein the display unit is configured to provide a three-dimensional display of the estimated road path in the direction of travel of the vehicle.

10. The driver assistance system according to claim 1, wherein the first portion of the road path is a portion that extends out to 500 meters from the vehicle.

11. The driver assistance system according to claim 1, further comprising:
  a control unit configured to adjust headlights of the vehicle based on the estimated road path in the direction of travel of the vehicle.

12. A non-transitory computer readable medium storing computer program code that, when executed by a computer, causes the computer to perform the functions of:
- code that receives stereo image data from the stereo vision system, and that detects roadside markers from the stereo image data;
- code that estimates a road path in a direction of travel of the vehicle, based on the roadside markers detected from the stereo image data; and
- code for detecting presence of other vehicles,
- wherein the code for estimating a road path estimates a first portion of the road path based on the roadside markers and estimates a second portion of the road path based on the detected other vehicles, and
- wherein the first portion of the road path is closer to the vehicle than the second portion of the road path.

13. The non-transitory computer readable medium according to claim 12, wherein the code that detects roadside marker detects light emanating from street lights, and
- wherein the code that estimates a road path estimates a location of each detected street light detected and estimates the road path as substantially corresponding to a curve formed by a locus of points corresponding to locations of each detected street light.

14. The non-transitory computer readable medium according to claim 12, wherein the code that detects roadside marker detects reflectors provided on sides of a road on which the vehicle is traveling, and
- wherein the code that estimates a road path estimates a location of each detected reflector detected and estimates the road path as substantially corresponding to a curve formed by a locus of points corresponding to locations of each detected reflector.

15. The non-transitory computer readable medium according to claim 12, wherein the computer further performs the function of:
- detecting a linear movement of the vehicle,
- wherein the code that estimates a road path to estimate the road path based in part on the linear movement of the vehicle detected over a predetermined time period.

16. The non-transitory computer readable medium according to claim 15, wherein the predetermined time period is a time period from a current time to X seconds in the past, X being a real number.

17. The non-transitory computer readable medium according to claim 12, wherein the code that detects roadside markers from the stereo image data detects relative three dimensional disposition of the roadside markers from the stereo image data with respect to each other.

18. The non-transitory computer readable medium according to claim 12, wherein the code that estimates a road path estimates an upwards and downwards disposition of the road path in the direction of travel of the vehicle.

19. The non-transitory computer readable medium according to claim 12, further causing the computer to perform the function of:
- displaying the estimated road path in the direction of travel of the vehicle.

20. The non-transitory computer readable medium according to claim 19, wherein the displaying is provided as a three-dimensional display of the estimated road path in the direction of travel of the vehicle.

21. The non-transitory computer readable medium according to claim 12, wherein the first portion of the road path is a portion that extends out to 500 meters from the vehicle.

22. The non-transitory computer readable medium according to claim 12, further causing the computer to perform the functions of:
- code for causing adjustment of headlights of the vehicle based on the estimated road path in the direction of travel of the vehicle.

23. A method of providing driver assistance when driving a vehicle, comprising:
- receiving stereo image data from the stereo vision system;
- detecting roadside markers from the stereo image data;
- estimating a road path in a direction of travel of the vehicle, based on the roadside markers detected from the stereo image data; and
- detecting a presence of other vehicles,
- wherein the step of estimating the road path in the direction of travel of the vehicle includes estimating a first portion of the road path based on the roadside markers and estimating a second portion of the road path based on other vehicles detected in the detecting step, and
- wherein the first portion of the road path is closer to the vehicle than the second portion of the road path.

* * * * *